J. V. Strait.
Mower.

No. 95,950.  Patented Oct. 19, 1869.

United States Patent Office.

JOEL V. STRAIT, OF LITCHFIELD, OHIO.

Letters Patent No. 95,950, dated October 19, 1869.

GEARING FOR MOWING-MACHINES

The Schedule referred to in these Letters Patent and making part of the same.

*To all whom it may concern:*

Be it known that I, JOEL V. STRAIT, of Litchfield, in the county of Medina, and State of Ohio, have invented a new and useful Improvement in Mowing-Machines; and I do hereby declare that the following is a full, clear, and exact description thereof, which will enable others skilled in the art to make and use the same, reference being had to the accompanying drawing, forming part of this specification, in which—

Similar letters of reference indicate corresponding parts.

Figure 1:
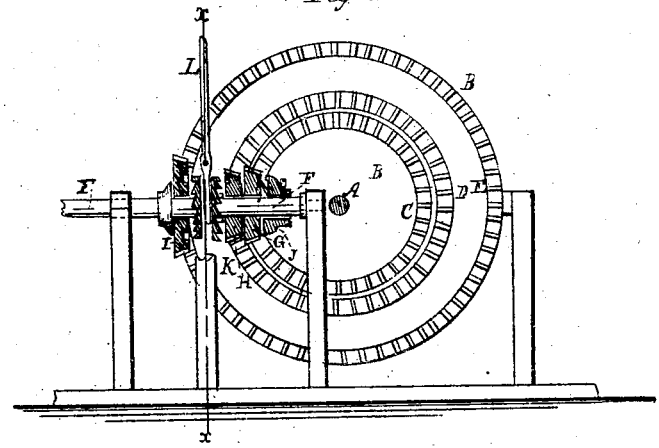
Figure 1 is a detailed view, illustrating my improvement, parts being broken away to show the construction.
Figure 2:
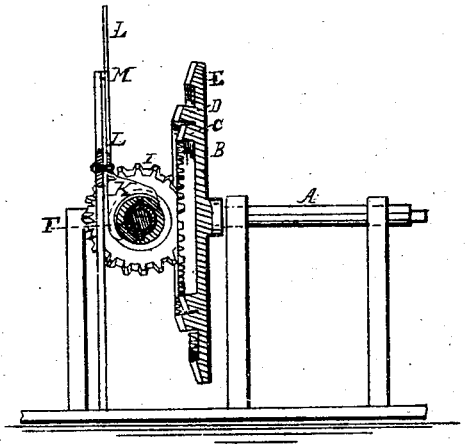
Figure 2 is a detailed vertical section of the same, taken through the line x-x, fig. 1.

My invention has for its especial object to improve the construction of the gearing of mowing-machines, so that a faster or slower movement may be given to the cutters, at the will of the operator, and which may be also applied with advantage to other gearing, where a different rate of movement is sometimes required; and It consists in the combination of several gear-wheels or sets of cogs, and several pinion-wheels, with the drive-wheel, and with the shaft, as hereinafter more fully described.

A represents the driving-shaft of a mowing-machine, to which motion is given in the ordinary manner.

B is the drive or main gear-wheel, which is attached to the shaft A.

Upon the face of the wheel B are formed different concentric gear-wheels, or different sets of cogs, C D E, so that as the shaft F is driven from one or the other of said gear-wheels, it may receive a greater or less velocity, as may be required.

F is the shaft from which motion is given to the cutters, and which revolves in bearings attached to the frame of the machine.

Upon the shaft F is placed a number of gear or pinion-wheels, G H I, equal in number to the number of gear-wheels C D E, upon the wheel B, and which are placed upon the shaft F in such positions as to mesh into the teeth of the said gear-wheels C D E, respectively.

J is a collar, placed upon the shaft F, near its inner end, and which is secured to said shaft F by a set-screw, or other convenient means.

To the side of the collar J, toward the wheel G, is attached a pawl, which takes hold of the ratchet-teeth formed upon or attached to the said gear or pinion-wheel G, so that when the shaft F is at rest, the pinion-wheel G may take hold of the said pawl, and carry the shaft F with it in its revolution, but when the shaft F is moving faster than the wheel G, the said pawl may slip over the said ratchet-teeth, allowing the wheel G to continue to revolve at the same rate of speed as before.

The pinion-wheels H and I, which mesh into the gear-wheels D and E, respectively, run loosely upon the shaft F, except when one or the other of said pinion-wheels is connected with said shaft F by the clutch K, so as to carry the said shaft with it in its revolution.

The clutch K is connected with the shaft F by a feather and groove, so that it may always revolve with said shaft, and at the same time have a longitudinal movement, so that it may be thrown into gear with one or the other of the pinion-wheels H I, according as it is desired to have the shaft F revolve with a faster or slower movement.

L is a lever, which is pivoted to some suitable support, attached to the frame of the machine, and the lower or forked end of which rides upon the clutch K.

The clutch K and lever L are so arranged, that when the said lever is in a vertical position the said clutch will gear into neither of the wheels H I, allowing them to run freely upon the shaft F, the said shaft F, in that case being driven by the wheel G.

By moving the upper end of the lever L in one or the other direction, the clutch K will be brought into contact with one or the other of the wheels H I, according to the rapidity of motion which it is desired to give to the shaft F, and consequently to the cutters.

The lever L is held securely in any position into which it may be adjusted, by the catch M, attached to the support to which the said lever L is pivoted.

Having thus described my invention,

What I claim as new, and desire to secure by Letters Patent, is—

The combination of wheel B, having the concentric gears C D E thereon, and arranged on shaft A, with the pawled fast collar J, ratchet spur-gear G, and clutch and gears H K I, arranged on the shaft F, all operating together, in the manner set forth.

JOEL V. STRAIT.

Witnesses:
E. H. RICHARDS,
W. S. BERDAN.